United States Patent [19]

Bartoschek et al.

[11] Patent Number: 5,217,205
[45] Date of Patent: Jun. 8, 1993

[54] HOUSING SEAT FOR A GATE VALVE

[75] Inventors: Manfred Bartoschek, Frankenthal, Fed. Rep. of Germany; Primo Lovisetto, Vicenza, Italy

[73] Assignee: KSB Aktiengesellschaft, Frankenthal, Fed. Rep. of Germany

[21] Appl. No.: 730,865

[22] PCT Filed: Jan. 9, 1990

[86] PCT No.: PCT/EP90/00038
§ 371 Date: Jul. 22, 1991
§ 102(e) Date: Jul. 22, 1991

[87] PCT Pub. No.: WO90/08281
PCT Pub. Date: Jul. 26, 1990

[30] Foreign Application Priority Data

Jan. 21, 1989 [DE] Fed. Rep. of Germany ....... 3901697

[51] Int. Cl.⁵ ............................................. F16K 1/00
[52] U.S. Cl. ..................................... 251/367; 251/366
[58] Field of Search ................................ 251/366, 367

[56] References Cited

U.S. PATENT DOCUMENTS

| 1,148,119 | 7/1915 | Patterson | 251/367 |
| 2,737,201 | 3/1956 | Clair et al. | 251/367 |
| 3,077,029 | 2/1963 | Kaye | 251/367 |
| 4,484,596 | 11/1984 | Hikade | 137/315 |

FOREIGN PATENT DOCUMENTS

| 0032183 | 11/1980 | European Pat. Off. . |
| 636842 | 10/1936 | Fed. Rep. of Germany . |
| 638462 | 11/1936 | Fed. Rep. of Germany . |
| 699580 | 12/1940 | Fed. Rep. of Germany . |
| 3609772 | 6/1990 | Fed. Rep. of Germany . |
| 522126 | 6/1940 | United Kingdom . |

Primary Examiner—A. Michael Chambers
Attorney, Agent, or Firm—Peter K. Kontler

[57] ABSTRACT

A valve has a housing, and a partition in the housing which is inclined to the transverse and longitudinal axes of the housing. The partition, which is welded to the housing, consists of a plate having an opening formed by bending portions of the plate out of the plane of the latter. The bent portions are inclined to such plane and include surfaces which bound the opening. These surfaces extend conically and define a valve seat.

9 Claims, 2 Drawing Sheets

HOUSING SEAT FOR A GATE VALVE

BACKGROUND OF THE INVENTION

This invention relates to a sheet metal component which serves as a dividing wall, as well as a carrier of the seating surface, of a gate valve and, in the valve housing, is disposed in a plane intersecting the transverse and longitudinal axes of the valve housing.

The German patent 638 462 discloses a sheet metal component which functions as an intermediate floor and a carrier of a seating ring. The sheet metal component is welded inside a valve housing via a circular seam in such a manner that the opening which receives the seating ring is normal to the axis of the flow path in the valve. The wall formed by the sheet metal component in the flow path, and the strong deflection of the flow at the valve seat, cause large flow losses.

A housing for shutoff elements is known from the European patent application 0 032 183 and has a sheet metal component which assumes the function of the dividing wall and the seating ring carrier. The sheet metal component is designed and arranged similarly to that described previously. It is further provided with a protuberance in which a conventional or specially made valve seat is secured. This valve, also, has the drawback of large flow losses.

SUMMARY OF THE INVENTION

It is an object of the invention to provide a sheet metal component which serves as a dividing wall and a carrier of the valve seating surface, is inexpensive and has favorable flow conducting characteristics adjusted to the nature of the valve housing.

The object set forth is achieved a sheet metal component comprising a plate provided with a conically calibrated, outwardly directed flange which is inclined to the plate and defines the seating surface for the valving element.

The sheet metal component of the invention makes it possible to provide a large flow opening on the axis of the connections because the wall portion acting as a dividing wall between the inlet and outlet regions can be small. This also yields the advantage that a valve housing equipped with such a dividing wall has little susceptibility to fouling. An additional advantage is that the design of the sheet metal component creates a flow which, due to its pressure distribution, produces a rinsing effect in the region of the seat endangered by fouling. The small amount of material consumed by, and the simple manufacture of, the sheet metal component of the invention constitute further advantages. A contributing factor here is that this sheet metal component defines the seating surface for the valve so that no additional part need be used and secured.

In principle, gate valves having a seating surface inclined to the flow direction are known from the German Offenlegungsschrift 36 09 772. However, in the gate valve illustrated in this publication, the part with the seat is integral with the housing. It is also designed differently from the sheet metal component of the invention.

BRIEF DESCRIPTION OF THE DRAWINGS

The invention is described in greater detail with reference the accompanying drawings wherein.

DESCRIPTION OF THE PREFERRED EMBODIMENTS

Figure 1:
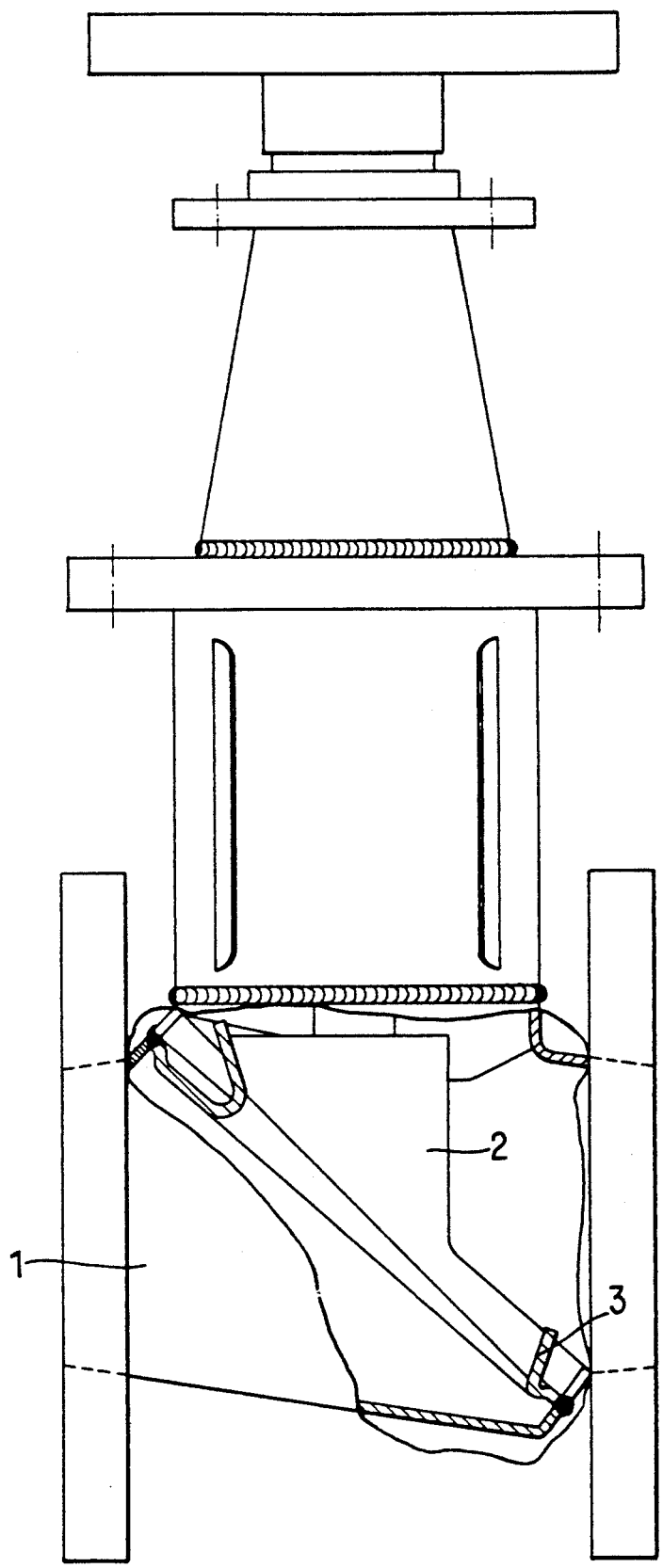
FIG. 1 shows a gate valve with a housing of sheet metal.

The gate valve shown in FIG. 1 has a sheet metal housing 1 in which the sheet metal component 3 forming the dividing wall, as well as the seating surface for a valving element 2, is welded. The elliptical opening of the sheet metal component 3 is so large that the sheet metal component 3 presents little surface area to resist the flow of a fluid stream conducted through the valve housing 1. In principle, this also applies for a stream flowing in the other direction; however, additional advantages are achieved for the above-mentioned flow direction. On the one hand, as can be readily seen, the outline of those surfaces of the sheet metal component 3 which are disposed in the flow path are responsible for this. On the other hand, the lower region of an outwardly directed flange 4 in the sheet metal component 3 defines a separating edge which contributes to the optimization of flow. Moreover, this produces a cleansing stream via a vortex directed transverse to the main flow.

Figure 2:
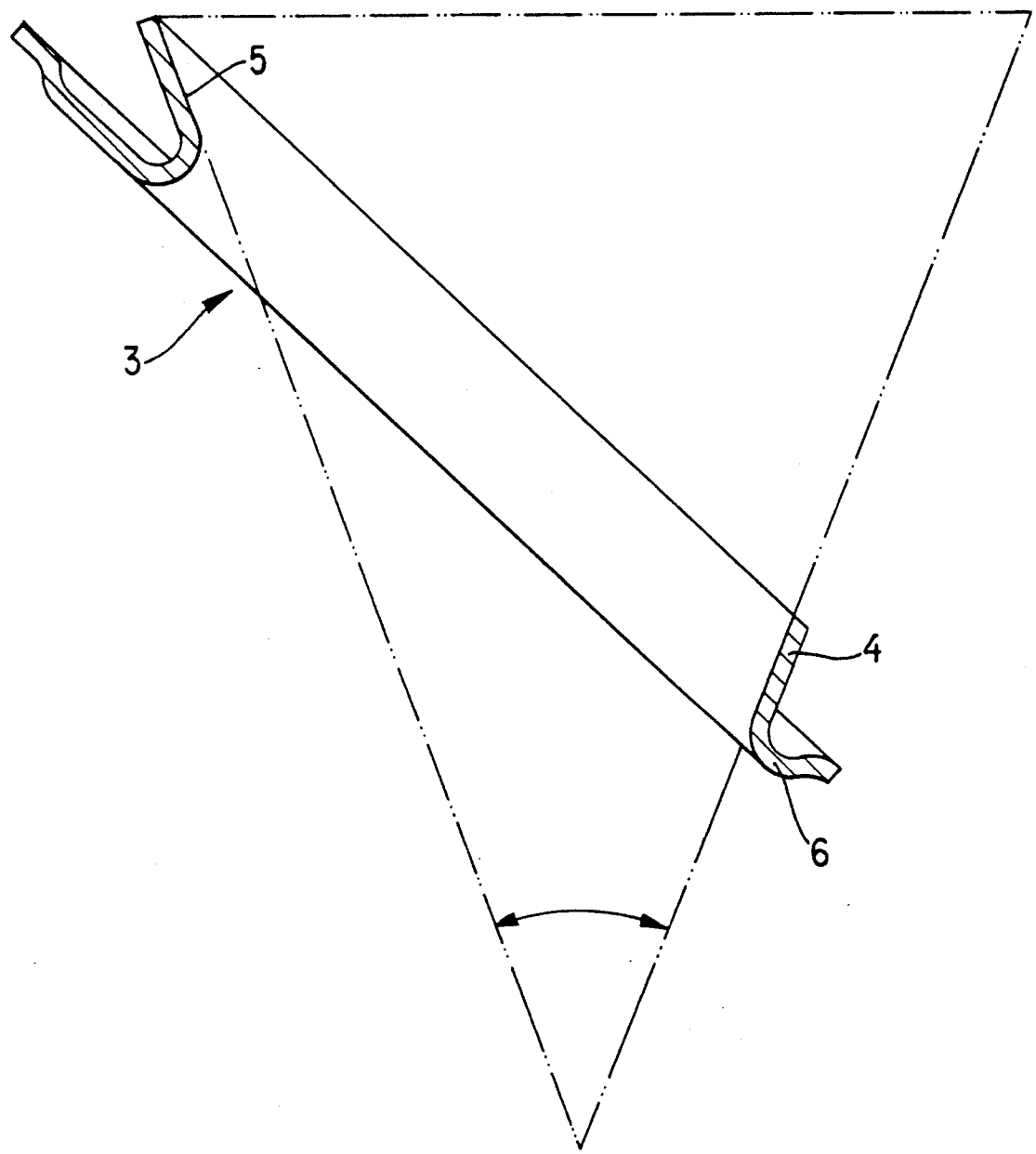
FIG. 2 is an enlarged detail view of the sheet metal component of FIG. 1 forming the dividing wall and the housing seating surface.

As illustrated in FIG. 2, the outwardly directed flange 4 of the sheet metal component 3 obtained from a circular plate is formed in such a manner with the assistance of a conical calibrating device that its sealing surface 5 can cooperate with a valving element 2 whose sealing surface defines a section of a conical surface. For reinforcement, the sheet metal component 3 also has a circular corrugation 6 which circumscribes the outwardly directed flange 4.

We claim:

1. A partition for a valve housing having transverse and longitudinal axes, comprising a plate-like member having an opening, and a flange flanking said opening and formed by bending a portion of said member, said member having first and second sections, said first section being located in a predetermined plane and said second section being provided with said opening and said flange, said flange being inclined to said plane and including a surface portion which at least partially bounds said opening and diverges as considered in a predetermined direction extending through said opening, and said surface portion extending substantially conically and at least in part constituting a valve seat, said member being insertable in the valve housing so that said predetermined plane intersects both transverse and longitudinal axes of the housing.

2. The partition of claim 1, wherein said member is substantially circular.

3. The partition of claim 1, wherein said member is provided with a corrugation.

4. The partition of claim 3, wherein said corrugation circumscribes said flange.

5. The partition of claim 1, wherein said member is provided with at least one embossment to stiffen said member.

6. The partition of claim 1, wherein said opening is substantially elliptical.

7. The partition of claim 6, wherein said opening has an axis which extends through said opening and is substantially perpendicular to said plane.

8. The partition of claim 1, further comprising a protective coating in the region of said surface portion.

9. A valve, comprising a housing having a transverse axis and a longitudinal axis; and a partition in said housing including a plate-like member having first and second sections, said first section being located in a predetermined plane which intersects both of said axes, and said second section being provided with an opening, and a flange flanking said opening and formed by bending a portion of said member, said flange including a surface portion which at least partially bounds said opening and diverges as considered in a predetermined direction extending through said opening, and said surface portion extending substantially conically and at least in part constituting a valve seat.

* * * * *